United States Patent [19]

Snyder

[11] 4,189,764
[45] Feb. 19, 1980

[54] CURRENT CONTROLLED INVERTER

[76] Inventor: Donald W. Snyder, 2533 Main St., Napa, Calif. 94588

[21] Appl. No.: 946,095

[22] Filed: Sep. 26, 1978

[51] Int. Cl.$^2$ .................................................. H02M 3/335
[52] U.S. Cl. ........................................ 363/21; 363/37; 363/97
[58] Field of Search ................................ 363/18–21, 363/37, 97

[56] References Cited

U.S. PATENT DOCUMENTS

| | | | |
|---|---|---|---|
| 3,222,587 | 12/1967 | Lichowsky | 363/37 X |
| 4,005,351 | 1/1977 | Blum | 363/21 X |
| 4,017,782 | 4/1977 | Wheeler | 363/19 |
| 4,017,785 | 4/1977 | Perper | 363/37 |
| 4,019,114 | 4/1977 | Huellwegen | 363/21 |
| 4,124,884 | 11/1978 | Episcopo | 363/21 |

*Primary Examiner*—William M. Shoop
*Attorney, Agent, or Firm*—Alvin E. Hendricson

[57] ABSTRACT

An inverter circuit changes direct current power into alternating current power at a desired voltage and frequency across the load and feeds power back into the direct current source by controlling the duration and spacing of controlled signals for a lightweight transformer in accordance with the direct current input voltage and a predetermined varying output voltage.

6 Claims, 7 Drawing Figures

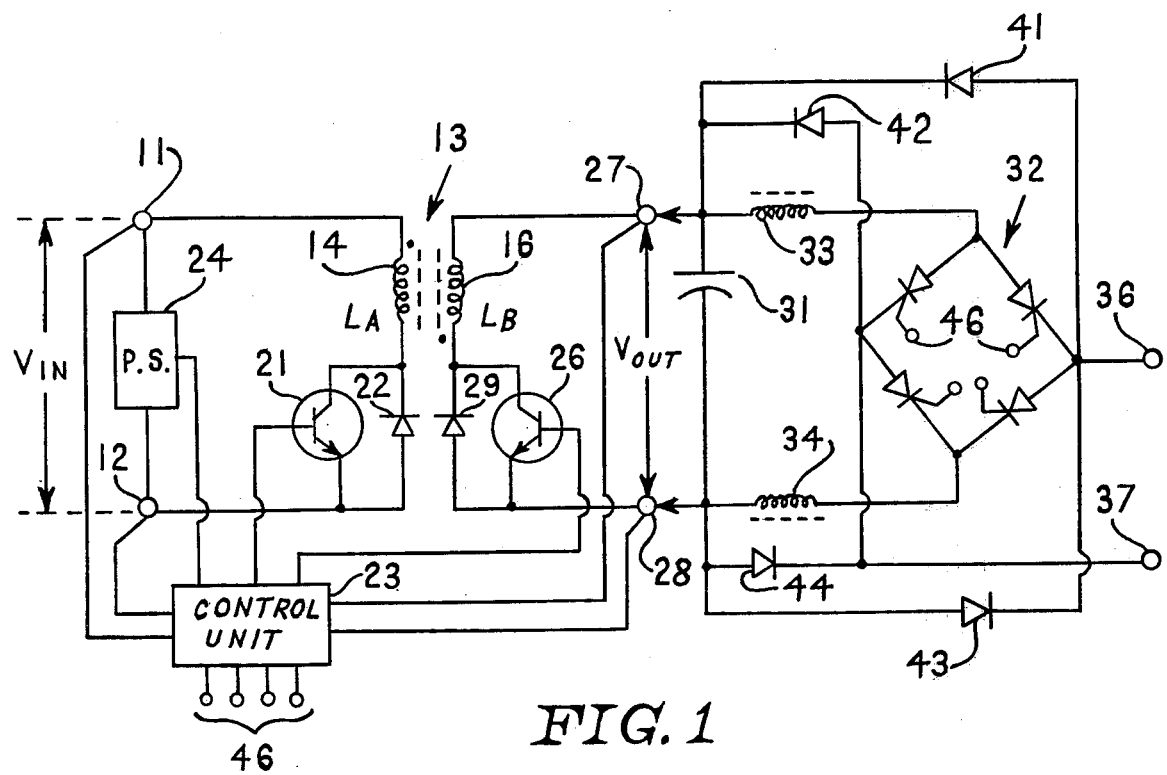
FIG. 1
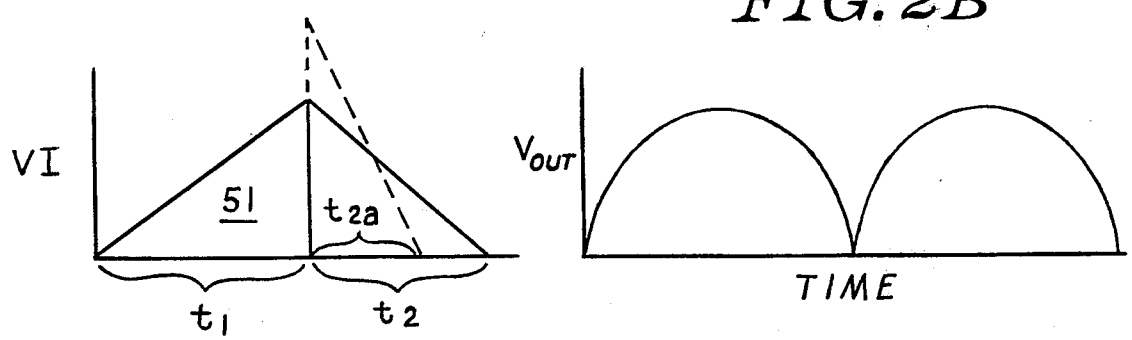
FIG. 2A
FIG. 2B
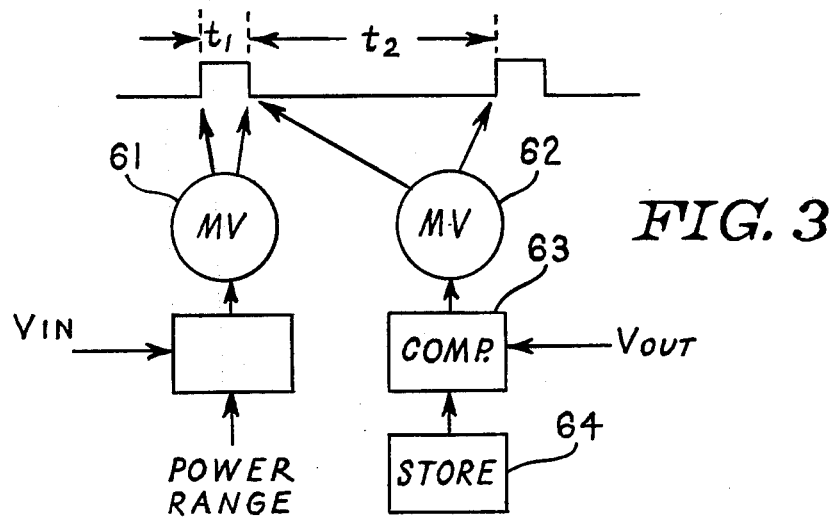
FIG. 3

CURRENT CONTROLLED INVERTER

SUMMARY OF INVENTION

The inverter of the present invention accommodates a wide variation in DC input voltage, while providing isolation between a DC source and an AC output. The present invention is particularly advantageous in employing only small lightweight transformers, particularly in comparison to conventional 60 cycle transformers. The inverter of the present invention operates to transmit power in both directions, so that the power factor can be corrected. The inverter hereof basically comprises a current source or a plurality of current sources and thus any number of units may be paralleled for increased power and additionally, short circuit protection is automatically attained.

The inverter of the present invention provides for switching the primary winding or inductor of a small transformer at a substantial rate and for controlling the duration that this inductor is connected across an input and disconnected from the input. A blocking diode in the secondary winding circuit of the transformer allows current to flow therein only when the primary winding is disconnected from the input terminals and an output capacitor across the secondary circuit is connected through a controlled bridge circuit or the like to produce 60 cycle alternating current at output terminals of the inverter.

Switching of the primary circuit, i.e., the DC input circuit may be accomplished by pulsed control signals applied to a transistor, for example. These pulsed control signals have a pulse width or duration controlled by the amplitude of the DC input voltage and a pulsed spacing which is a function of the output voltage across the capacitor of the secondary circuit and a sine wave voltage of predetermined frequency.

A sine wave AC output of the present invention is obtained through a silicon control rectifier bridge, for example, and provision is made for a feeding power from the output end of the system back into the direct current source. Thus the present invention provides for bi-directional power flow which is highly advantageous for many applications, such as wind driven generators, or the like.

DESCRIPTION OF FIGURES

The present invention is illustrated as to particular preferred embodiments thereof in the accompanying drawings wherein:

FIG. 1 is a circuit diagram of a basic inverter in accordance with the present invention;

FIG. 2A is a diagram illustrating charging and discharging of the inductors of the transformer of FIG. 1 and FIG. 2B is a voltage diagram of output voltage across the secondary of the transformer of FIG. 1;

FIG. 3 is a schematic illustration of functions performed by the control unit of FIG. 1;

DESCRIPTION OF PREFERRED EMBODIMENTS

Figure 4:
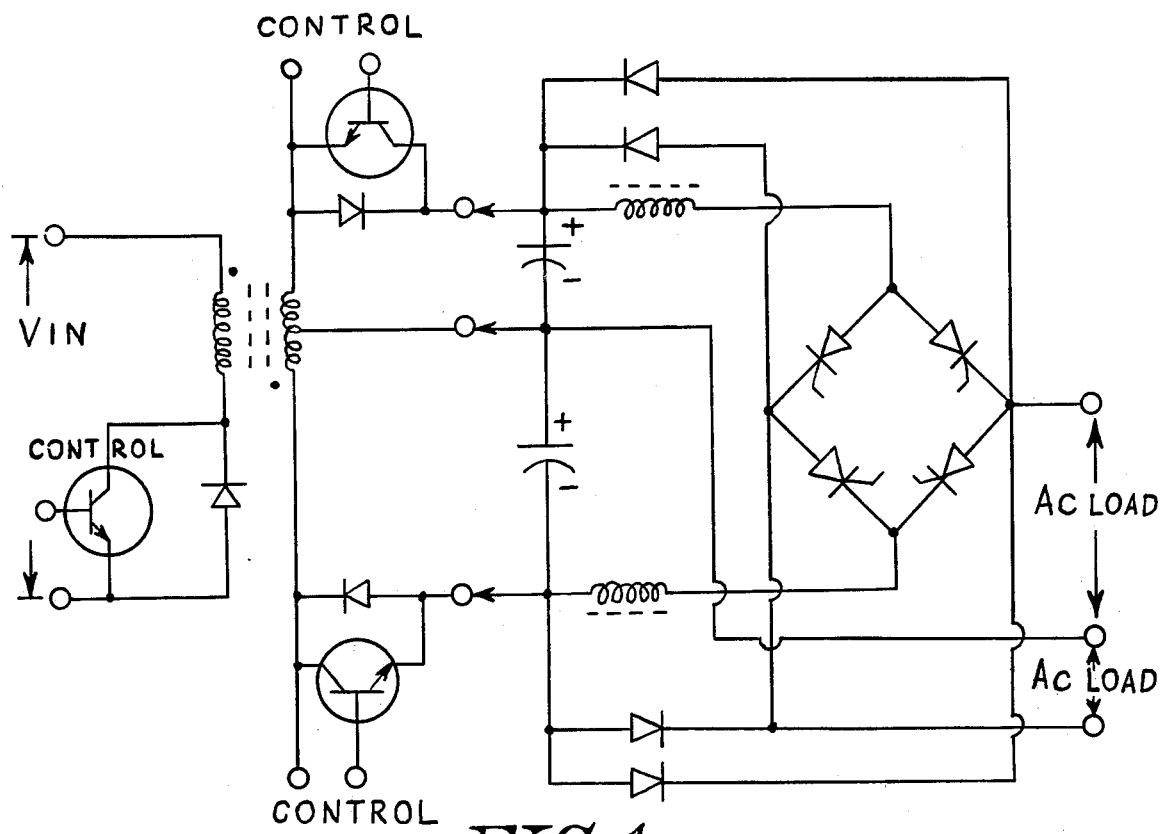
FIG. 4 is a circuit diagram of a double-ended inverter in accordance to the present invention.

The inverter of the present invention operates to convert raw DC power into useable 50 to 60 cycle AC power. The present invention is, in fact, a power inverter and a compact lightweight low cost unit will handle 5KVA. The invention is capable of operating in both master and synchronous modes, to produce a control sine wave output voltage which is completely isolated from the input and the inverter is capable of operating over a wide range of DC input voltages, such as from 75 to 200 volts DC.

Reference is now made to FIG. 1 of the drawings illustrating a simplified inverter in accordance with the present invention. The circuit of FIG. 1 includes a pair of DC input terminals 11 and 12 which may be connected to any desired source of direct current power, such as one or more batteries, or possibly, some type of wind power generator, wherein the DC output voltage may vary considerably. If some type of DC generating system is to be connected across the input terminals 11 and 12, there would normally be employed one or more large capacitors across these terminals in order to absorb power that may be fed back into the input or source, as further described below.

The circuit of FIG. 1 includes a small high frequency type transformer 13 of a non-saturating type, having a primary winding 14 and a secondary winding 16. The primary winding may be considered to have an inductance $L_A$ and the secondary winding to have an inductance of $L_B$. The primary winding 14 of the transformer 13 is shown to be connected in series with a transistor 21 across the input terminals 11 and 12. A blocking diode 22 is connected in parallel with the transistor 21 so as to prevent the flow of current from terminal 11 to terminal 12, except through the transistor 21. The transistor 21 is operated by pulsed control signals from a control unit 23. A power supply circuit 24 is shown to be connected between the terminals 11 and 12 for producing predetermined power supply voltages in conventional manner and apply such voltages to elements of the present invention as required, including the control unit 23.

The secondary circuit of the transformer 13 includes a transistor 26 connected in series with the secondary winding 16 across secondary terminals 27 and 28. A blocking diode 29 is connected across the transistor 26 in series with the winding 16 in order to prevent the flow of current from terminal 27 to terminal 28 through transistor 26.

The circuit described above between terminals 11-12 and 27-78 comprises a single module of the present invention and a plurality of these modules may be connected in parallel across the terminals 27 and 28 for increasing the current carrying capacity of the overall system.

An output capacitor 31 is shown to be connected between the output terminals 27 and 28, and a voltage $V_{OUT}$ which appears across this capacitor is employed in operating the circuit as described below. The module proceeding terminals 27 and 28 comprises a current source having the output thereof applied across the large capacitor 31 which may, for example, have a capacitance of the order of 50 microfarads. A bridge circuit 32 formed of silicon control rectifiers (SCRs) is connected across the capacitor 31 by inductances 33 and 34 to invert alternate half cycles and apply this AC output between output terminals 36 and 37. Provisions is also made in the output circuit for feeding power back into the above-noted module or modules across terminals 27 and 28. To this end diodes 41 and 42 are connected to conduct from terminals 36 and 37 to terminal 27 and diodes 43 and 44 are connected to conduct from terminal 28 to terminals 36 and 37, respectively. The bridge circuit 32 may be conventional in comprising four properly oriented SCRs with each having a control terminal 46 receiving signals from the control unit 23. In the simplified circuit of FIG. 1 there is not shown circuitry for turning off the SCRs of the bridge circuit, however, this may be conventionally accomplished and reference is made to FIG. 6 for such a circuit in a double-ended embodiment.

Considering now the operation of the circuit of FIG. 1 and particularly, the module at the left thereof, it will be seen that a current will flow through the primary winding 14 during the period of conduction of the transistor 21. This period is made quite small compared to the period of a half cycle of AC output from the inverter, and may, for example, have a duration of 100 micro seconds. During the time current is flowing from terminal 11 to terminal 12 through winding 14 and transistor 21, the diode 29 in the secondary circuit of the transformer prevents current from flowing therein. As soon as the transistor 21 becomes non-conducting i.e., at the termination of the control or drive pulse from the control unit 23, the situation will be reversed so that current does flow through the diode 29 and secondary winding 16 so as to charge the capacitor 31. As previously noted, the direct current voltage between the input terminals 11 and 12 may vary substantially, such as, for example, from 75 volts to 200 volts, and the amount of power that passes through the primary winding 14 will depend upon the value of the input voltage ($V_{IN}$) x the inductance ($L_A$) and the total energy is thus the product of the foregoing multiplied by the time ($t_1$) that the transistor 21 conducts. This time ($t_1$) is controlled by the control unit 23 in accordance with the value of ($V_{IN}$) as indicated in FIG. 1. With the transformer 13 being non-saturating the current thereacross follows a ramp function, so that the total power is as indicated at FIG. 2A by the area 51.

Upon termination of the control pulse of the transistor 21, a transformer action occurs wherein a current blows in the secondary winding 16 of the transformer at a voltage $V_{OUT}$ until substantially the same amount of energy 51 appears in the secondary circuit. This is illustrated in FIG. 2A by the solid triangle to the right of the figure, wherein the time ($t_2$) indicates the period of energy transferred through the transformer. This same time ($t_2$) is the period of non-conduction of transistor 21. It will be appreciated that the secondary current is the same as the primary current at the instant transformer action commences. Consequently, it will be seen that if the output voltage is the same as the input voltage, the transfer of energy will be illustrated by the isosceles triangle shown in solid lines in FIG. 2A. If, on the other hand, $V_{OUT}$ is greater than $V_{IN}$, energy will be transmitted at a larger VI initially, so that power in the secondary circuit may be indicated by the dashed lines of FIG. 2A wherein full power transmission is accomplished in the time $t_{2a}$. The time $t_2$ during which the transistor 21 is non-conducting, is controlled by the control unit 23 from the output voltage $V_{OUT}$ as compared to a desired half cycle sine wave, as indicated in FIG. 2B.

Reference is made to FIG. 3 wherein the general functions in the control unit 23 are indicated with respect to controlling the pulses operating the transistor 21. The duration of ($t_1$) of the transistor control pulse may be controlled by a multi-vibrator 61 in accordance with $V_{IN}$ which may be modified in accordance with the power range in which the circuit is operating. The separation of transistor pulses, ($t_2$), may be controlled by a multi-vibrator 62 operated by a comparator 63, comparing the actual $V_{OUT}$ with points on a half cycle sine wave as stored in a storage unit 64. Thus by controlling the transistor 21 it is possible to produce rough half cycle sine waves across the capacitor 31.

It will be appreciated that the transformer 13 may be operated in either direction and thus the transistor 26 is provided for the purpose of switching the winding 16 during power transmission to the left in the circuit of this figure. The elements of the bridge circuit 32 are, of course, switched in and out of the circuit in pairs, as for example, by the control unit 23 in order to alternate half sine waves to produce an actual sine wave output at the terminals 36 and 37. The portion of the circuit of FIG. 1 to the right of terminals 27 and 28 may be varied in a variety of ways, and likewise the module to the left of these terminals is subject to variation in accordance with the present invention.

Figure 5:
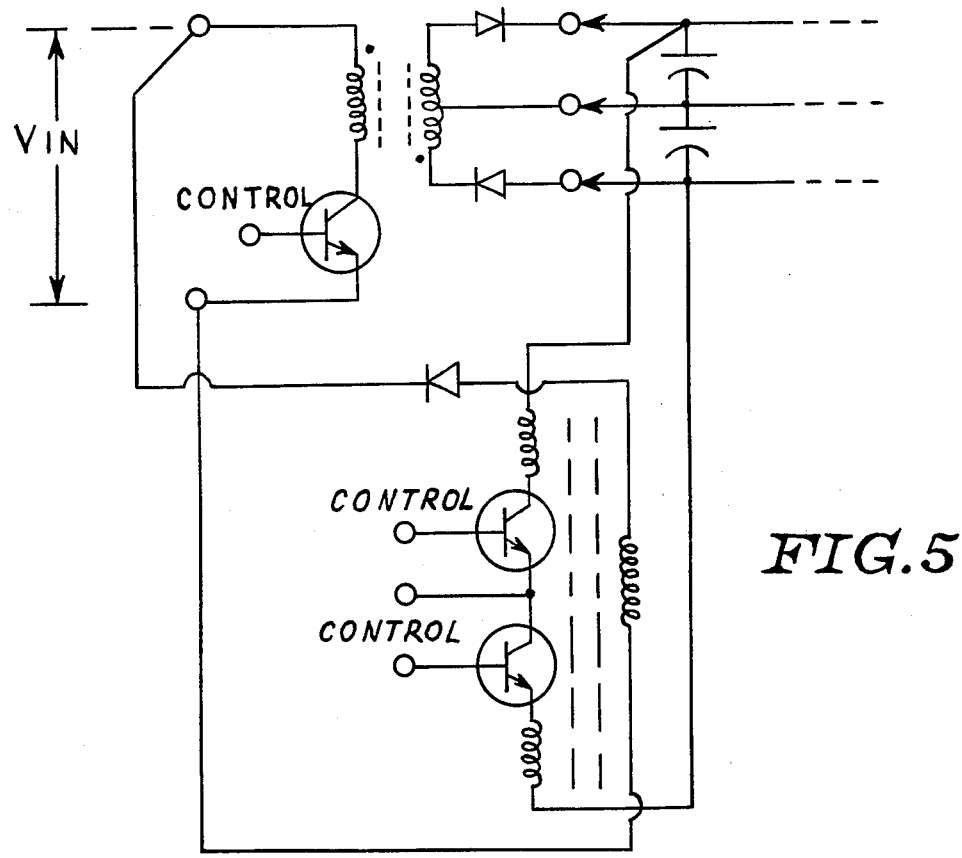
FIG. 5 is a circuit diagram of separated bi-directional circuits of an inverter in accordance with the present invention.
Figure 6:
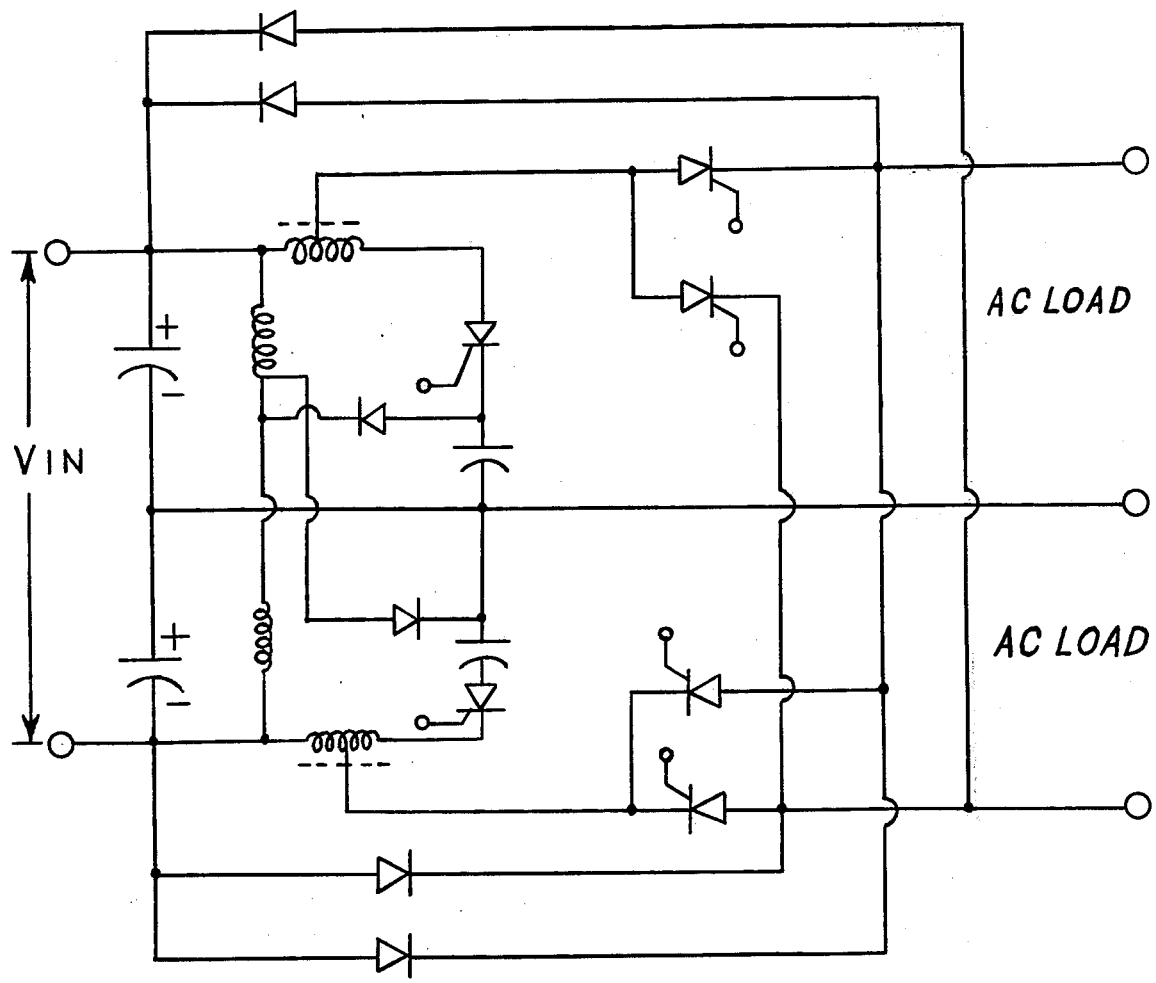
FIG. 6 is a circuit diagram of a circuit for turning off the SCR's of an output bridge circuit in the present invention.

Various modifications and variations of the present invention are illustrated in additional figures of the drawings. Thus FIG. 4 illustrates a center-tapped double-ended output arraingment which will be seen to operate in the same manner at the circuit of FIG. 1 described above. FIG. 5 illustrates an alternative arrangement in accordance with the present invention wherein a separate transformer and control is employed for the transmission of power from the AC terminals to the DC terminals. Here again, the basic concepts of the present invention are the same as described above. FIG. 6 illustrates one possible arraingment of circuitry for turning off SCRs that may be employed in the bridge circuit 32. Inasmuch as alternative elements and circuits may be employed in this respect, no further description hereof appears necessary.

The present invention, as described above, is highly advantageous in minimizing the weight and cost of power inverters. Inasmuch as numerous modifications and variations of the present may be made within the spirit and scope of the present invention, it is not intended to limit the invention to the precise terms of description or details of illustration.

What is claimed is:
1. An inverter system comprising
   a high frequency non-saturating transformer having a primary and a second winding,
   direct current input terminals,
   first controllable switching means connecting said primary winding across said input terminals,
   a capacitor connected through a first blocking diode across said secondary winding, and
   control means connected to operate said switching means in accordance with the amplitude of voltage across said input terminals and in accordance with the variation of voltage across said capacitor from half sine wave voltage values.
2. The inverter of claim 1 further defined by
   second controllable switching means connected across said first blocking diode in series with said secondary winding across said capacitor, a second blocking diode connected in series with said primary winding across said first switching means, and said control means operating said second switching means in accordance with the voltage across said capacitor and the voltage across said input terminals to transmit power back to said input terminals.

3. The system of claim 1 further defined by said first blocking diode being oriented to prevent current flow through said secondary winding during current flow through said primary winding and first switch.

4. The system of claim 2 further defined by
a controlled bridge circuit coupled by inductors across said capacitor for reversing the polarity of alternate half cycles of voltage on said capacitor and applying said voltage to output terminals as a sine wave of predetermined voltage amplitude and frequency,
a first pair of diodes connecting a first side of said capacitor in a forward diode direction to said output terminals, and
a second pair of diodes connecting a second side of said capacitor in a reverse diode direction to said output terminals for feeding power in both directions through said system.

5. The system of claim 1 further defined by
said control means operating said switching means at a rate that is many times the frequency of said half sine wave and controlling the duration of each period of conduction of said first switching means in accordance with the voltage across said input terminals and the duration of each period of non-conduction of said first switching means in accordance with said variation of voltage across said capacitor from half sine wave voltage.

6. An inverter comprising
a high frequency non-saturating transformer having a primary winding and a secondary winding;
direct current input terminals,
first controllable switching means connecting said primary winding across said input terminals,
a first blocking diode connected across said first switching means,
a large capacitor connected between output terminals and connected through a second blocking diode across said secondary winding,
second controllable switching means connected across said second blocking diode, and
control means connected across said input and output terminals and connected to control said first switching means for conduction from voltage across said input terminals and non-conduction from voltage across said output terminals for forward power inverting and controlling said second switching means for conduction from voltage across said output terminals and non-conducting from voltage across said input terminals for reverse inverting.

* * * * *